(12) United States Patent
Leung

(10) Patent No.: US 6,178,085 B1
(45) Date of Patent: Jan. 23, 2001

(54) CALCULATOR LID MECHANISM

(75) Inventor: Chan Sik Leung, Kowloon (HK)

(73) Assignee: CCL Products Enterprises, Inc., Baldwin, NY (US)

( * ) Notice: Under 35 U.S.C. 154(b), the term of this patent shall be extended for 0 days.

(21) Appl. No.: 09/157,187

(22) Filed: Sep. 18, 1998

Related U.S. Application Data

(60) Provisional application No. 60/083,249, filed on Apr. 27, 1998.

(51) Int. Cl.[7] .............................. H05K 5/00; H05K 5/03; G06C 7/02
(52) U.S. Cl. ..................... 361/683; 361/681; 361/680; 235/1 D; 235/145 R; 16/277
(58) Field of Search .................................. 361/679, 683; 364/708.1; 16/287, 298, 302, 319, 328, 361, 366, 277; 235/145 R, 1 D; 368/276, 286; 248/118, 118.1, 118.3, 118.5; D7/2, 6, 7, 11; D14/100, 105

(56) References Cited

U.S. PATENT DOCUMENTS

| | | | |
|---|---|---|---|
| D. 249,822 | * 10/1978 | Ohie et al. ..................... D64/11 B |
| D. 426,849 | * 6/2000 | Lee ................................ D18/7 |
| 3,881,807 | * 5/1975 | Hosokawa et al. ............ 350/160 LC |
| 3,952,365 | * 4/1976 | Grisebach .......................... 16/52 |
| 4,259,568 | 3/1981 | Dynesen . |
| 4,290,168 | * 9/1981 | Binge ............................... 16/175 |
| 4,390,289 | * 6/1983 | Houlihan .......................... 368/286 |
| 4,450,454 | * 5/1984 | Koto ................................ 346/140 R |
| 4,703,160 | 10/1987 | Narishima et al. . |
| 4,820,908 | 4/1989 | Wei . |
| 5,128,829 | * 7/1992 | Loew ................................ 361/380 |
| 5,239,731 | * 8/1993 | Lu ..................................... 16/340 |
| 5,303,291 | * 4/1994 | Takagi et al. .................... 379/433 |
| 5,335,273 | * 8/1994 | Takagi et al. .................... 379/433 |
| 5,425,157 | * 6/1995 | Chang ............................... 16/381 |
| 5,530,234 | 6/1996 | Loh et al. . |
| 5,555,157 | * 9/1996 | Molller et al. ................... 361/683 |
| 5,568,358 | 10/1996 | Nelson et al. . |
| 5,607,054 | 3/1997 | Hollingsworth . |
| 5,732,135 | * 3/1998 | Weadon et al. .................. 379/433 |
| 5,737,163 | * 4/1998 | Kobayashi et al. .............. 361/683 |
| 5,828,587 | * 10/1998 | Bedol ........................... 364/705.02 |
| 5,881,150 | * 3/1999 | Persson ............................ 379/433 |
| 6,085,384 | * 7/2000 | Bivens ............................. 16/54 |

FOREIGN PATENT DOCUMENTS

| | | | |
|---|---|---|---|
| 2211323 | * 6/1989 | (GB) | G06F/01/00 |
| 57-103872 | * 6/1982 | (JP) | 400/88 |
| 57-143626 | * 9/1982 | (JP) | 708/100 |
| 63-231563 | * 9/1988 | (JP) | G06F/15/02 |
| 64-18864 | * 1/1989 | (JP) | G06F/15/02 |
| 3-162025 | * 7/1991 | (JP) | 455/575 |
| 4-117848 | * 4/1992 | (JP) | H04M/01/02 |

* cited by examiner

*Primary Examiner*—Leo P. Picard
*Assistant Examiner*—Anatoly Vortman
(74) *Attorney, Agent, or Firm*—Scully, Scott, Murphy & Presser

(57) ABSTRACT

A calculator which generally possesses a flat, compact and portable housing construction, and which includes a calculator lid mechanism which pivots a flat cover of the calculator in a predetermined controlled manner between a first position causing the flat cover to form a lid which overlies a calculator display, and a second operational position in which the cover is pivoted towards the rear of the calculator so as to form a stand for tilting the calculator into an upwardly inclined ergonomic position relative to a horizontal support surface during intended use thereof. Upon the actuation of a switch, a release mechanism enables the lid to be pivoted rearwardly in a controlled damped manner about a hinge connection, which articulates the lid to the calculator housing, under the urging of a torsion spring and damping drum arrangement constituting the lid mechanism located within a tubular bore within the hinge portion of the lid structure into an essentially perpendicular orientation relative to the rear surface of the calculator housing so as to form the stand for tiltingly support the calculator when positioned on a horizontal surface.

9 Claims, 3 Drawing Sheets

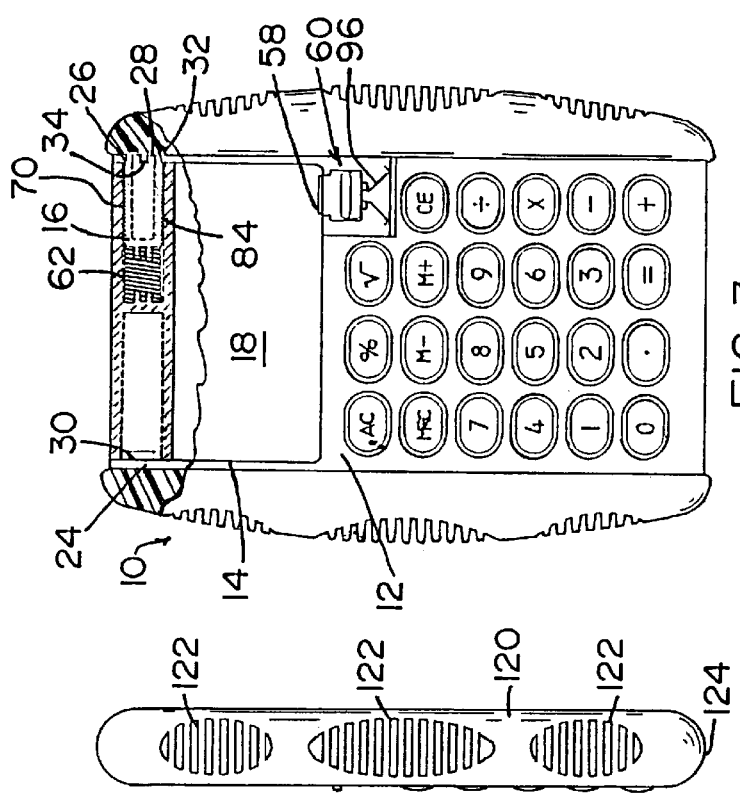
FIG. 3
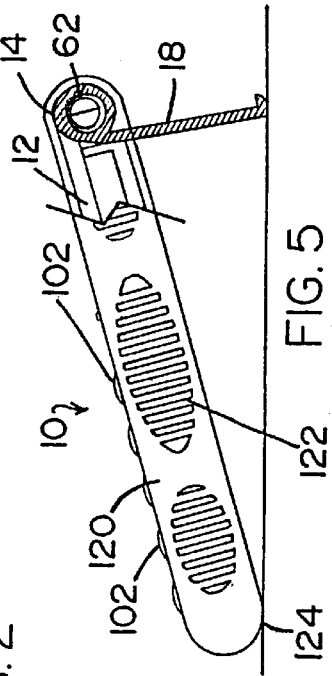
FIG. 5
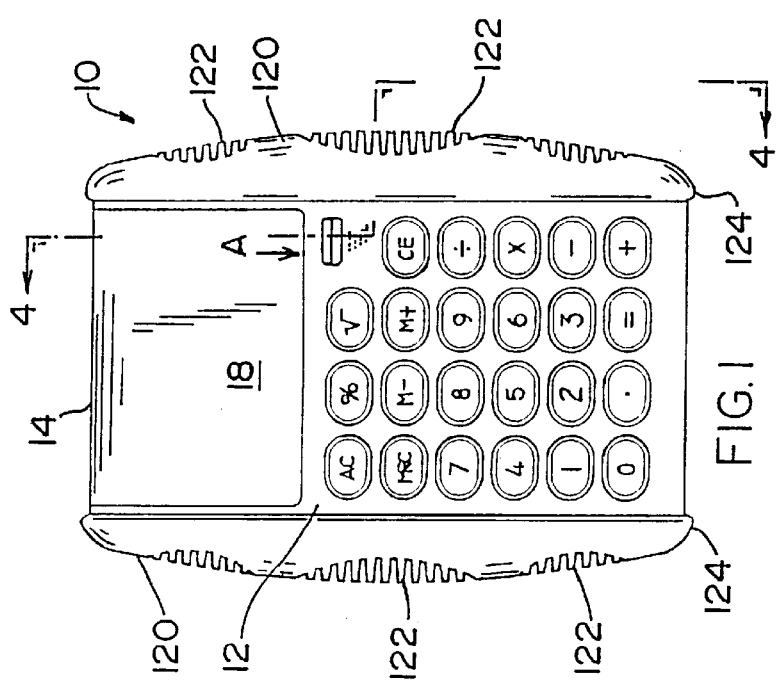
FIG. 2
FIG. 1
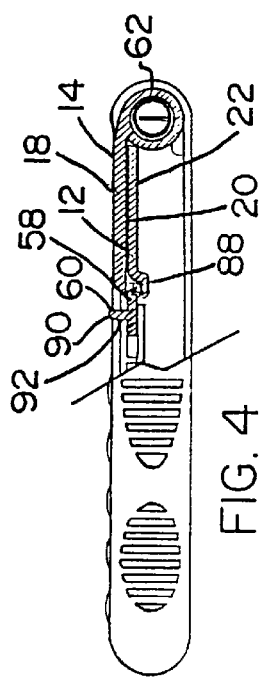
FIG. 4

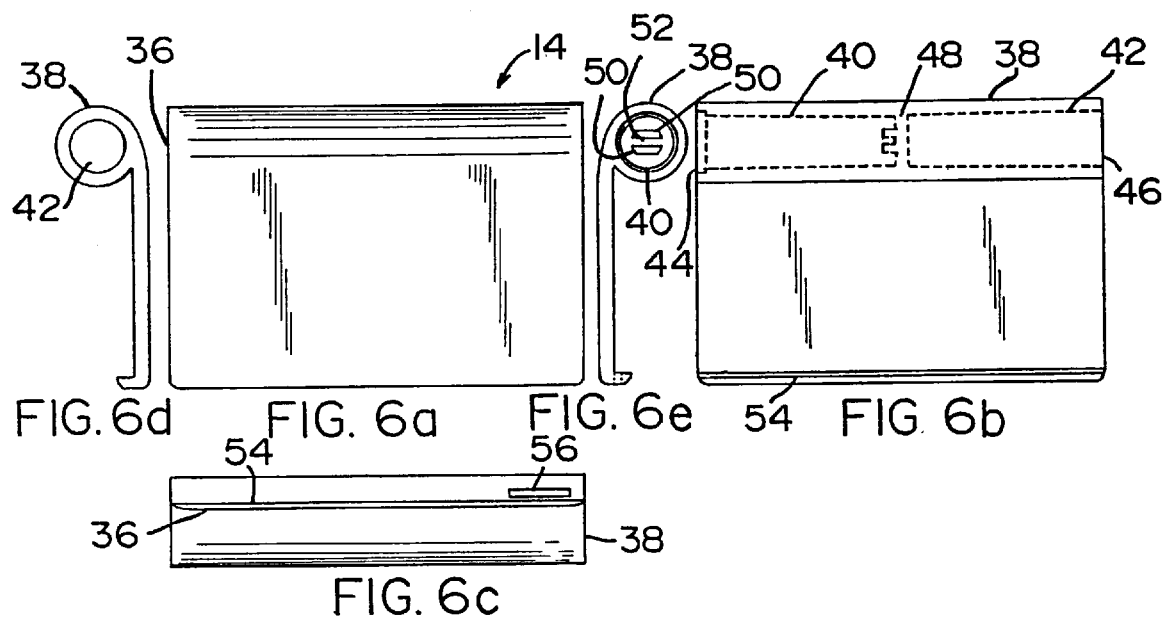
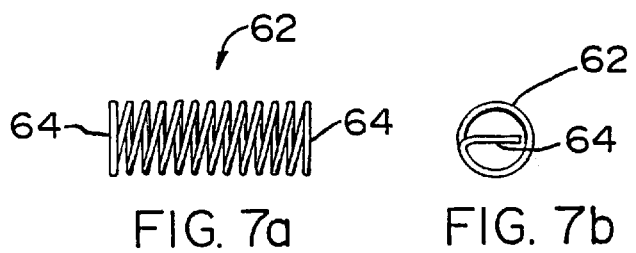

CALCULATOR LID MECHANISM

CROSS-REFERENCE TO RELATED APPLICATIONS

This application claims the benefit of the filing date of U.S. Provisional Patent Appln. No. 60/083,249; filed Apr. 27, 1998.

BACKGROUND OF THE INVENTION

The present invention relates to a calculator which generally possesses a flat, compact and portable housing construction, and more specifically pertains to a calculator lid mechanism which pivots a flat cover of the calculator in a predetermined controlled manner between a first position causing the flat cover to form a lid which overlies a calculator display, and a second operational position in which the cover is pivoted towards the rear of the calculator so as to form a stand for tilting the calculator into an upwardly inclined ergonomic position relative to a horizontal support surface during intended use thereof.

DISCUSSION OF THE PRIOR ART

The utilization of hand-held or portable pocket-sized calculators or various other small devices which incorporate cover or lid structures, and which are adapted to form stands or supports for the calculators or devices when located on a horizontal surface, is well-known in the technology.

Hollingsworth, U.S. Pat. No. 5,607,054 discloses a carrying case for a notebook computer wherein front and back panels are adapted to cover the computer, and whereby, in an opened positioned, the front panel incorporates structure adapted to be folded rearwardly forming a stand so as to be able to support the notebook computer in an inclined or ergonomically comfortable position for a user.

Nelson, et al., U.S. Pat. No. 5,568,358 discloses a portable signal processing communications unit having a cover structure which is hinged to one end of a housing containing operating components, and wherein the cover structure may be folded backwardly about its hinge connection to the housing so as to form an inclined supporting structure for maintaining the signal processing and communications unit in a upwardly tilted position during use when located on a horizontal supporting surface.

Loh, et al., U.S. Pat. No. 5,530,234 discloses a hand held calculator wherein a cover which is adapted to extend over the entire front surface of the calculator when the latter is not in used, is adapted to be slid towards one end of the calculator by means of elements on the cover engaging in a pair of longitudinal side grooves of the calculator housing. Thereafter the cover may be rotated to extend below the rear of the calculator so as to form a stand or support through the intermediary of a raised portion of the hinge which will maintain the calculator in an inclined or a tilted position when positioned on a horizontal surface.

Narishima, et al., U.S. Pat. No. 4,703,160 discloses a casing structure for a portable electronic appliance, such as a small hand held portable calculator, wherein portions of the casing of the computer which are hinged to each other may be folded backwardly in order to form a supporting stand for maintaining the calculator or device in an inclined or tilted position during use on a support surface.

Dynesen, U.S. Pat. No. 4,259,568 discloses a portable or pocket calculator in which casing structure includes hinged cover portions attached to one end of the casing structure, and wherein the cover portions are adapted to be folded rearwardly when the calculator is deposited and supported on a horizontal surface so as to provide a stand construction maintaining the calculator in an upwardly tilted position. When not in use, the components which are hinged to the calculator casing structure may be folded forwardly and layed flat over the surface of the calculator so as to form a protective flat cover extending over the entire front surface of the calculator.

Although the above-mentioned publications disclose various types of cover structures for hand-held or pocket calculators or similar small-sized electronic units and devices, none of these disclose a simple construction wherein a spring-loaded lid or cover element is hingedly connected to the housing of a hand-held or pocket calculator, and upon actuation of a switch is adapted to swing rearwardly in a controlled damped manner so as to provide visual access to a display panel in the front of the calculator housing, while concurrently forming a stand for calculator when located on a horizontal supporting surface.

SUMMARY OF THE INVENTION

In order to attain the foregoing, the present invention provides for a novel construction of a calculator lid mechanism, wherein a lid structure is hingedly connected thereto an upper end of a calculator housing, and which in the inoperative condition of the calculator, or when the latter is to be stored, is maintained in a lay flat covering orientation over a display panel which is located in the front surface of the calculator housing so as to protectively cover the display panel. Upon the actuation of a switch, a release mechanism enables the lid to be pivoted rearwardly in a controlled damped manner about a hinge connection, which articulates the lid to the calculator housing, under the urging of a torsion spring and damping drum arrangement located within a tubular bore within the hinge portion of the lid structure into an essentially perpendicular orientation relative to the rear surface of the calculator housing so as to form a stand for tiltingly support the calculator when positioned on a horizontal surface.

In essence, the calculator lid structure includes a generally flat cover portion, which in a first inoperative condition of the calculator is adapted to overlie the calculator display panel. Integrally formed at one end of the flat cover portion is an open-ended tubular hinge portion having two coaxially cylindrical compartments or blind bores extending towards each other from opposite ends mounting trunnions which project inwardly from upper ends of flanges extend from the side walls of the calculator housing, are adapted to be jointed to, respectively, the opposite open ends of the cylindrical bores and form hinge connections for the lid structure with the calculator housing. One of the blind bores or cylindrical compartments or blind bores of the tubular lid hinge portion constitutes a damping cylinder which receives a torsion spring and a damping drum. A damping grease is adapted to be introduced between the surface of the damping cylinder and the damping drum to thereby facilitate a controlled and damped pivoting action of the lid mechanism, and resulting of the lid structure, when the cover portion of the latter is released from its latched position over the calculator display, through the actuation of a spring-biased switch and latching element.

Accordingly, it is an object of the present invention to provide a lid structure for a calculator including novel calculator lid mechanism adapted for controlled pivoting actuation to alternatively form a cover for a display panel and a stand for the calculator.

Another object of the present invention resides in the provision of a novel lid structure for a calculator having a portion forming a cover for a display panel on the front surface of a calculator housing when not in use, and adapted to be released so as to pivot rearwardly of the calculator housing about a hinge portion of the lid structure incorporating novel lid mechanism for controlling the pivoting speed in the opening of the lid when pivoted into an operative position forming a stand for the calculator.

Yet another object of the present invention is to provide a novel calculator lid mechanism within a hinge structure of the lid structure which, in a first position thereof, covers a display panel on the front surface of the calculator, and in a second operative position, is adapted to be pivoted rearwardly so as to form a stand for the calculator, wherein the hinge structure incorporates novel operative mechanism comprising a torsion spring, damping drum and damping grease located therein to thereby impart controlled damped pivoting movement to the lid structure.

A still further object of the present invention is provide a novel calculator lid mechanism for a lid structure which is maintained in a covering position over a display panel in the front surface of the calculator housing, and wherein a simple pulling action releases a latching element which enables the lid structure to be released and the lid mechanism to impart controlled damped rotation to the lid rearwardly about a hinge connection containing the lid mechanism so as to form a stand for the calculator when positioned on a horizontal support surface.

BRIEF DESCRIPTION OF THE DRAWINGS

Reference may now be had to a preferred embodiment of the invention comprising a portable calculator possessing a lid structure incorporating novel lid mechanism, taken in conjunction with the accompanying drawings; in which:

FIG. 1 illustrates a front view of the calculator in which the inventive lid mechanism is shown to maintain a cover-forming lid portion in a latched position over a calculator display panel in the calculator housing;

FIG. 2 illustrates a side view of the calculator of FIG. 1;

FIG. 3 illustrates a view similar to FIG. 1 with a portion of the front of the calculator broken away to provide visual access to the inventive lid mechanism;

FIG. 4 illustrates a partially sectional view taken along line 4—4 in FIG. 1;

FIG. 5 illustrates a view similar to FIG. 4 showing the cover in an open and rearwardly pivoted position so as to form a stand for the calculator when supported on a horizontal surface;

FIGS. 6(a) through 6(e) illustrate, respectively front, rear, bottom, and end views of the display cover and hinge structure for containing the lid mechanism pursuant to the invention; and FIG. 7(a) and 7(b) illustrate, respectively side and end views of a torsion spring utilized in the lid mechanism;

FIGS. 8(a), 8(b) and 8(c) illustrate, respectively, a longitudinal sectional view and end views of the damping drum utilized in the lid mechanism pursuant to the invention;

DETAILED DESCRIPTION OF A PREFERRED EMBODIMENT

Figure 9:
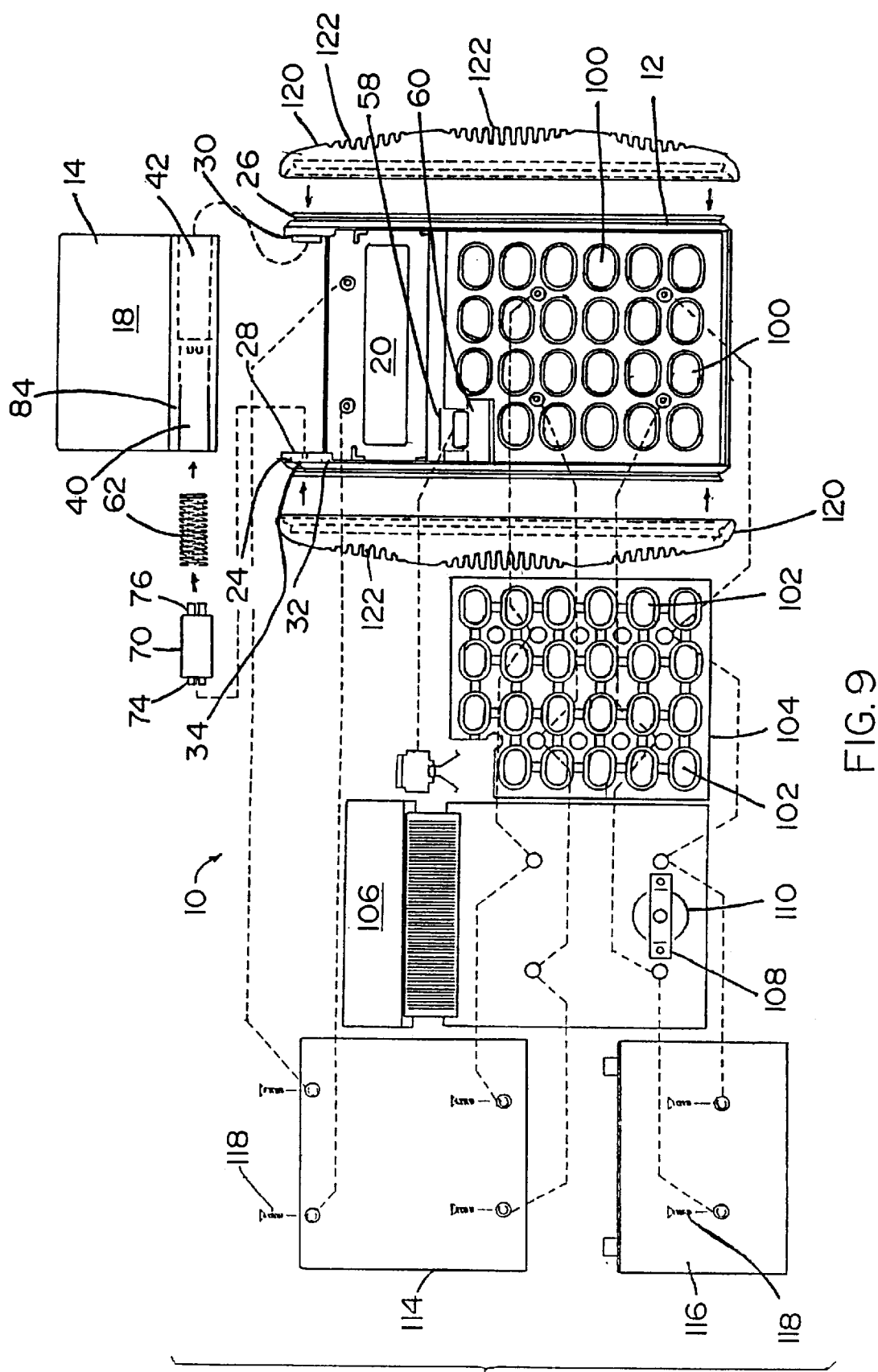
FIG. 9 illustrates an exploded rear view of the calculator components prior to assembly, showing the various operative constituents thereof.

As can be ascertained from FIGS. 1 to 5, the portable, hand-held calculator 10 includes a housing 12 which is of a generally rectangular, relatively flat box-like structure, as shown in FIGS. 1 and 2. The partially cross-sectional views of FIGS. 3 and 4 diagrammatically illustrate a lid structure 14 hingedly articulated to housing 12 and incorporating a lid mechanism 16 possessing a flat plate-shaped cover portion 18 represented in its closed and latched position over calculator display panel 20 which is arranged in the front housing surface portion 22 of the calculator housing 12.

As can be ascertained from particularly FIGS. 3 and 9 of the drawings, the housing 12 includes a pair of upwardly extending flange elements 24, 26 at opposite sides thereof, each of which includes a short inwardly extending trunnion-like projection 28, 30. One of the projections 28 is of a circular shape, whereas the other projection 30 is larger in diameter, and projection 28 contains a circular recess 32 including a horizontal rib 34 extending radially from the bottom of the recess 32.

The lid structure 14 as illustrated in detail in the drawing FIGS. 6a through 6e essentially comprises a generally rectangular flat plate portion 36 having an upper edge which curves rearwardly so as to extend into a tubular portion 38 which is adapted to form a hinge construction for articulated connection of the lid structure 14 with the trunnion-like projections 28, 30 on the housing flanges 24, 26.

The tubular portion 38 is provided with cylindrical blind bores 40, 42 which extend coaxially towards each other from the opposite ends 44, 46 of the tubular portion, and are separated by means of a wall 48 forming the bottoms of the blind bores 40, 42.

One of the cylindrical blind bores 40 includes at its bottom a pair of parallel spaced upstanding ribs 50 defining a linear spacing 52 therebetween, the function of which is described more specifically hereinbelow.

The opposite edge 54 of the flat plate portion 36 of the lid structure 14 includes a narrow upstanding flange 54 having an elongate aperture 56 formed therein towards one end thereof, which aperture is adapted to be engaged by the latch element 58 of a switch device 60, as described hereinbelow.

Insertable into the blind bore 40 which contains at its bottom the projecting ribs 50 forming the spacing 52 therebetween, is a helical coil spring 62, which is preferably constituted of a spring steel, and which is represented in FIGS. 7(a) and 7(b), with both ends of the spring 62 having the end portions 64 thereof extending transversely across the center of the diameter of the spring so as to form straight and essentially rigid rod-like elements.

As shown in specific detail in FIGS. 8(a) through (c), a damping drum 70, which is of a hollow cylindrical construction having a recess 72 cut in at one open end 74 thereof, and spaced protrusions 76 defining spaces 78 therebetween at the opposite closed end 80, is adapted to be inserted into the blind bore 40 so as to, in conjunction with the helical coil spring 62 form the lid mechanism 16 for effectuating the pivoting movement of the lid structure 14 relative to the housing 12. The assembly of the components of the lid mechanism 16 into the blind bore 40 so as to effectively facilitate the controlled damped pivoting of the lid structure comprises inserting the helical coil spring 62 into the blind bore 40 having the spaced ribs 50 therein, such that the leading end portion 64 of the spring which extends across the diameter thereof is clampingly engaged in the spacing 52 between the two ribs 50 at the bottom of the blind bore 40, which will prevent rotation of that end of the spring 62 relative to the bore 40 and resultingly the lid structure 14.

The other end of the spring 62 which, similarly, possesses a transverse end piece extending across the diameter thereof, is clampingly engaged in the space 78 between the protrusions 76 at the closed end 80 of the damping drum 70, which is of a length so as to axially compress the spring 62 when fully inserted into the blind bore 40. Thus, the spring 62 and the damping drum 70 have their interconnected ends secured against relative rotation.

The lid structure 14 containing the spring 62 and damping drum 70 in the bore 40, subsequent to introducing a damping grease 84 of a viscous nature into the annular space between the cylindrical surface of the blind bore 40 and the external cylindrical surface of the damping drum 70, wherein the surface of the bore 40 in that region may be roughened, serrated or ridged so as to prevent outward leakage of the damping grease 84, is positioned between the trunnion projections 28, 30 on the flange elements 24, 26 of the housing. This causes the slot or recess 72 formed in the open end of the damping drum 70 to engage over the rib 34 formed in the trunnion which is adjacent thereto. This will prevent relative rotation between the drum 70 and the housing 12, but enable rotation of the drum 70 within bore 40 relative to the lid structure 14.

The closing of the lid structure 14 causes the elongate aperture 56 in flange 54 to be engaged by a projecting ledge or tab 88 of a slideable switch element 90 of the switch in the form of a plate member having a projection 92 extending through a slot 94 in the front housing portion, and which is adapted to be finger-actuated in opposition to the biasing latching force of a spring 96 which is retained in the housing 12. Thus, upon pulling or pressing the switch element 90 downwardly in a direction as illustrated by the arrow A in FIG. 1, the tab 88 disengages from the aperture 56 and releases the lid structure 14.

Inasmuch as the helical coil spring 62 in the bore 40 has been previously torsionally prestressed, the release of the switch element 90 by pressing the latter downwardly against the force of the biasing spring element 96 in the housing 12, imparts a torsional or rotational unwinding force to the coil spring 62, so as to forcibly cause the lid structure 14 to pivot or rotate rearwardly into the position, shown in FIG. 5, to thereby form a stand for tilting the calculator so as to assume an ergonomic position when located on a flat horizontal support surface.

The rate of movement or speed in the rearward pivoting of the lid structure 14 upon the release thereof is controlled by means of the damping drum 70 and the damping grease 84 arranged thereabout in contact with the inner surface of the blind bore 40 which, in essence, forms a damping cylinder. This structure will slow down and counteract any tendency for rapid pivoting movement of the lid structure 14 which could conceivable cause the calculator to bounce and possibly damage the delicate internal components or electronics thereof. As indicated, the damping grease 84 may be a highly viscous oil or grease, or any similar suitable damping material which will not readily leak from the open end of the blind bore 40 forming the damping cylinder.

In order to close the calculator, it is merely necessary to position the cover plate portion 36 over the calculator display panel 20 by manually pivoting the lid structure 14 forwardly about the hinge-forming trunnion elements or projections 28, 30 until such time as the tab 88 of the switch element 98 engages into the aperture 56 of the cover and retains the lid structure 14 in its latched and closed position, as shown in FIG. 1. Thereafter, in order to again be able to operate the calculator 10, it is merely necessary to depress or pull the switch element 90 downwardly, as shown by arrow A in FIG. 1, releasing the cover portion and enabling the lid mechanism 16 to implement the previously described damped and controlled pivoting motion into the position in which the cover plate forms a stand for the calculator 10.

The entire calculator 10 is of a relatively simple construction, as shown by the unassembled plan view in FIG. 9 of the components thereof, and which the front housing portion includes a series of openings 100 for the extension therethrough of actuator rubber buttons 102 which may be imprinted or embossed with suitable alphanumeric legends representative of a standard calculator keyboard layout. The buttons 102 may be mounted on a support or substrate 104 comprising a panel having a printed circuit board 106 and battery attachment 108 for retaining a battery 110 in position thereon. This arrangement is located rearwardly of the openings in the front portion of the housing 12.

Prior to installing the lid structure 14, the torsionally prestressed helical coil spring 62 is inserted into bore 40, the damping grease 84 applied over the damping drum 70 upon insertion of the latter into bore 40 so as to fill the space between the inner surface of the blind bore or drum cylinder 40, and the entire lid mechanism 16 together with the lid structure 14 assembled on the hinge-forming trunnion projections 28, 30.

Thereafter, upon the panel 104 with the buttons 104 and the switch and latching elements having been assembled into the housing 12, and the printed circuit board 106 and battery 110 placed thereon, suitable rear panel elements 114, 116 are fastened to the housing 12 by means of suitable fastener screws 118, thereby assembling the entire unit.

At this time, in order to make the calculator 10 more user-friendly when manually held operated, the sides of the housing 12 are provided with the elongate rubber gripping elements 120, which include grooving 122 so as to prevent them from slipping out of the hand of a user. Moreover, the bottom ends 124 of the rubber gripping elements 12 may also extend beyond the housing 12 so as to form friction contact surfaces whereby when the lid structure 14 is pivoted rearwardly into a stand, as shown in FIG. 5, the calculator 10 will be inhibited from sliding on a support surface when positioned thereon.

From the foregoing, it clearly appears that the entire calculator assembly, including the novel lid mechanism 16 is of a simple and inexpensive construction providing a light weight and user-friendly calculator structure. Moreover, the entire calculator, if desired, may be provided in different decorative colors as may be desired by a manufacturer.

With the exception of the electronics, and the rubber components, such as the rubber buttons for operating the calculator, and the rubber elements, the components for the housing 10 and lid structure 14 may be formed of molded plastic material which is generally rigid in nature; this also being applicable to the damping drum and latching switch; whereas the helical coil spring and switch spring may be constructed of suitable spring steel, as is well known in the technology.

While there has been shown and described what is considered to be a preferred embodiment of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A portable hand-held calculator, comprising:

(a) a generally flat rectangular housing containing operating electronics and an array of calculator actuating buttons; a display panel being located on a front surface of said housing proximate said array of actuator buttons; said housing including a pair of flanges extending from opposite side edges of said housing in parallel spaced relationship; and hinge-forming trunnions being formed on inwardly facing surfaces of said flanges;

(b) a lid structure connected to said trunnions for pivotal motion relative to said housing, said lid structure including a flat cover portion and a tubular portion formed along one edge of said flat cover portion extending between said trunnions, said tubular portion including cylindrical bores extending along the longitudinal axis thereof; and (c) a lid operating mechanism including damping means arranged within at least one said cylindrical bore, biasing said lid toward a rearwardly pivoted position, and effectuating a controlled pivotal motion of said lid structure between the closed position thereof covering said display panel and the rearwardly pivoted position exposing said display panel and forming a stand for supporting said calculator in a tilted position on a horizontal surface.

2. A calculator as claimed in claim 1, wherein said cylindrical bores in said tubular portion comprise coaxial blind bores extending towards each other from opposite ends of said tubular portion of the lid structure, said damping means being arranged in one of said blind bores.

3. A calculator as claimed in claim 2, wherein said damping means comprises a helical coil spring inserted into said blind bore, one end of said spring being secured against rotation to a bottom surface of said blind bore; and a damping drum being inserted into said blind bore in axial contact with the opposite end of said spring, said damping drum having one end secured to said spring so as to be rotatable in conjunction with said adjoining end of the spring, and an opposite end of said damping drum being secured against rotation to one of the hinge-forming trunnions on said housing flanges.

4. A calculator as claimed in claim 3, wherein said blind bore forms a damping cylinder closely encompassing said helical coil spring and said damping drum; and damping means being interposed between the inner surface of said damping cylinder and an outer cylindrical surface of said damping drum to assist in controlling the speed of the rearward pivotal motion of said lid structure.

5. A calculator as claimed in claim 4, wherein said damping means comprises a viscous grease.

6. A calculator as claimed in claim 3, wherein the opposite end of said damping drum which is secured to said trunnion on said flange forms one end of a hinged connection between said housing and said lid structure, and the distal end of said tubular portion is rotatably journaled on the other said trunnion so as to form an opposite end of the hinged connection.

7. A calculator as claimed in claim 1, wherein spring-biased switch means are mounted in said housing for engaging said flat cover portion of the lid structure so as to normally maintain said cover in a latched position over said display panel, said switch means being manually operable to release said cover portion and facilitate rearward pivotal motion thereof responsive to the operative force imparted to said lid structure by said lid operating mechanism.

8. A calculator as claimed in claim 1, wherein resilient gripping structures are mounted to extend along opposite sides of said housing.

9. A calculator as claimed in claim 8, wherein said gripping structures comprise elongate rubber members having transverse grooves formed therein to facilitate manual handling of said calculator.

* * * * *